(12) United States Patent
Ozaki

(10) Patent No.: US 6,425,047 B1
(45) Date of Patent: Jul. 23, 2002

(54) PROCESS CONTAINING ADDRESS DECODERS SUITED TO IMPROVEMENTS IN CLOCK SPEED

(75) Inventor: Shinji Ozaki, Suita (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 125 days.

(21) Appl. No.: 09/602,180

(22) Filed: Jun. 22, 2000

(30) Foreign Application Priority Data

Jun. 24, 1999 (JP) .......................................... 11-177982

(51) Int. Cl.$^7$ .............................................. G06F 13/00
(52) U.S. Cl. .............................. 711/101; 710/6; 710/33
(58) Field of Search .............................. 711/101; 710/6, 710/33

(56) References Cited

U.S. PATENT DOCUMENTS

| | | | | |
|---|---|---|---|---|
| 5,442,767 A | * | 8/1995 | Eickemeyer et al. .......... 711/1 |
| 5,745,913 A | * | 4/1998 | Pattin et al. ................. 711/105 |
| 5,860,151 A | * | 1/1999 | Austin et al. ................ 711/213 |

* cited by examiner

Primary Examiner—David L. Robertson
(74) Attorney, Agent, or Firm—Price and Gess

(57) ABSTRACT

A processor that accesses a plurality of regions allocated to memory includes: a judging unit for judging which region is accessed based on an access address; an assuming unit for assuming which region is accessed based on the access address, the assuming unit producing an assumption result faster than the judging unit produces a judgement result; an accessing unit for starting access based on the assumption result; a detecting unit for detecting a disagreement between the judgement result and the assumption result; and a control unit for stopping the access that has been started if the detecting unit has detected the disagreement, and controlling the accessing unit to perform another access based on the judgement result.

21 Claims, 12 Drawing Sheets

STEP 1: MEMORY ADDRESS CALCULATION
STEP 2: SPACE JUDGEMENT
        (DECODE 18-BIT ADDRESS)
STEP 3: ACCESS MODE SETTING

EX STAGE FOR MEMORY ACCESS INSTRUCTION

STEP 1: MEMORY ADDRESS CALCULATION
STEP 2: FIRST SPACE JUDGEMENT
 (DECODE 18-BIT ADDRESS)
STEP 2': SECOND SPACE JUDGEMENT
 (DECODE TWO-BIT ADDRESS)
STEP 3: ACCESS MODE SETTING
STEP 4: DISAGREEMENT DETECTION

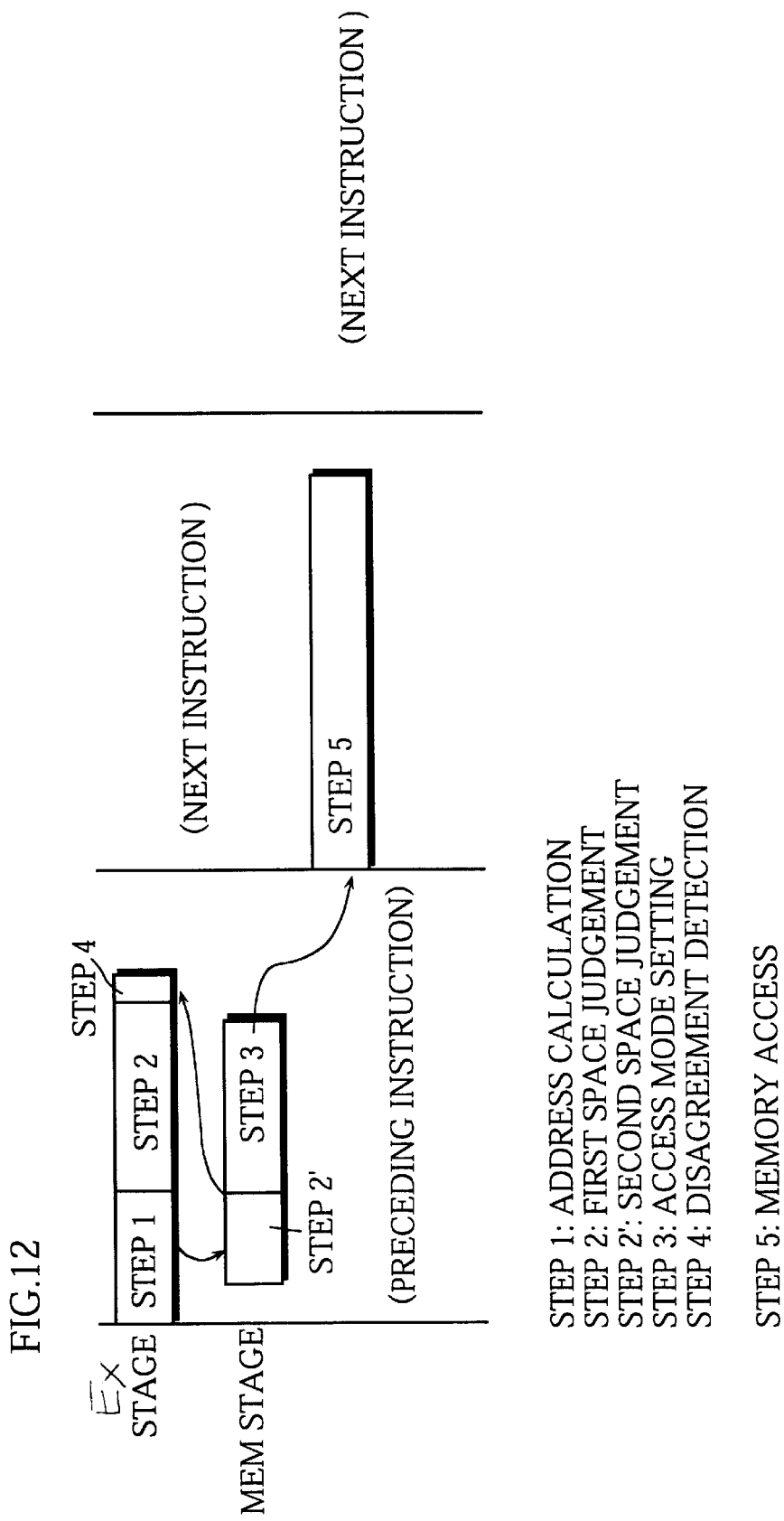

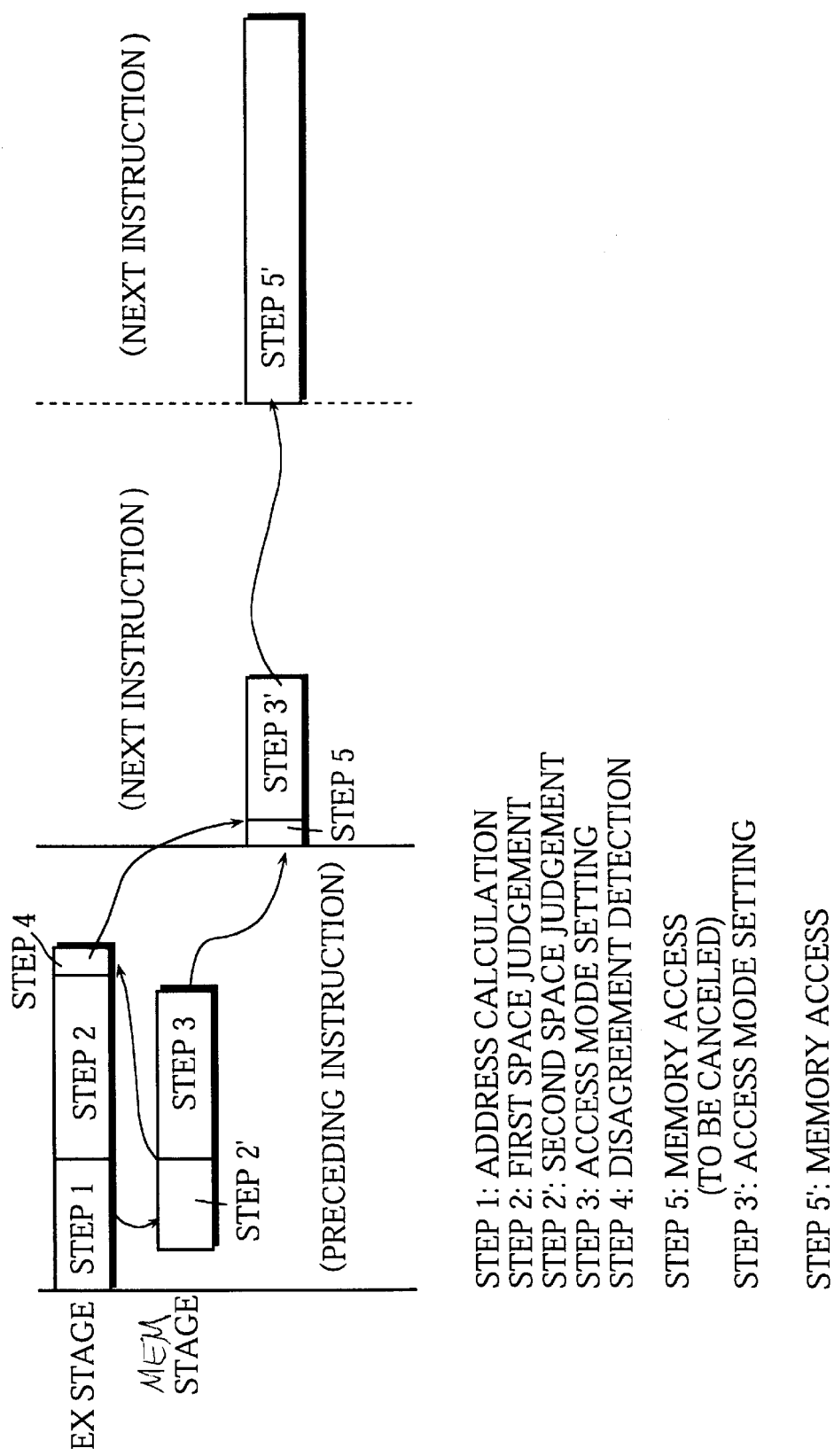

PROCESS CONTAINING ADDRESS DECODERS SUITED TO IMPROVEMENTS IN CLOCK SPEED

BACKGROUND OF THE INVENTION (1) Field of the Invention

The present invention relates to a processor that is used in a large scale integration (LSI) such as a microcomputer or a digital signal processor (DSP), and more specifically to a processor containing address decoders that are suited to improvements in clock speed.

(2) Description of the Related Art

Operating speed and performance of a processor that is used in an LSI, such as a microcomputer and a DSP, continue to be improved. In particular, the increase in the operating speed (i.e., operating frequency) of processors has greatly exceeded the increases in operating speeds of semiconductor circuit elements such as logic gates and memory.

Super-pipelining is one method to improve the operating speed of a processor to shorten the processing cycle of the processor. This technique increases the number of pipeline stages for the processor and so reduces a substantial processing time per cycle.

However, an increase in the number of pipeline stages used to process instructions leads to a higher occurrence of hazards due to data dependencies between the instructions being executed. This means that it is not enough to simply increase the number of pipeline stages. In particular, the occurrence of hazards is closely linked to the number of pipeline stages used for instruction fetch operations and memory access operations (memory read and write for operand data). This means that it is preferable to increase operating speed without increasing the number of pipeline stages.

The following describes a memory access by a conventional processor to read or write operand data. This processor is assumed to operate in a five-stage pipeline consisting of: an instruction fetch (hereafter, IF) stage, an instruction decode (ID) stage, an execution (EX) stage, a memory access stage (MEM), and a write back (WB) stage. When executing a memory access instruction, this processor performs the following steps in the EX stage: step 1 for calculating a memory address using operands designated in an instruction; step 2 for decoding the calculated address to judge which memory region should be accessed; and step 3 for setting an access mode in preparation for the following MEM stage, where the processor accesses the memory according to the set access mode.

FIG. 1 shows an example memory map in an address space that is accessed by the above processor according to a 32-bit address. As shown in the memory map, the following three types of regions (hereafter memory-mapped regions) are mapped into the address space, with two separate regions existing for each region type: RAM (random access memory) regions; ROM (read only memory) regions; and I/O (input/output) interface regions. In this way, the I/O interface regions are mapped into the same address space as the memory (i.e., memory-mapped I/O is used).

FIG. 2 shows the operation contents for the EX stage, where the conventional processor processes a memory access instruction by performing the following steps: step 1 for calculating a 32-bit address using the operand data of the memory access instruction; step 2 for decoding the calculated 32-bit address to judge which of the six memory-mapped regions (i.e., the two RAM regions, the two ROM regions, and the two I/O interface regions) is specified by the 32-bit address; and step 3 for setting the access mode based on the result of the judgement in step 2 and the result of the decoding of the memory access instruction in the previous ID stage. This access mode setting in step 3 is performed by determining the contents of the access mode based on the decoding result in the ID stage, and by initializing control signals (i.e., preparing to assert certain control signals) based on the access mode that has been determined. Here, the control signals include a write enable (WE) signal and a chip select (CS), and the access mode shows information such as whether the memory access is for a read or a write, and the size of data (hereafter called an access data size) to be transferred through the access. Note that the decoding of the highest-order eighteen bits is sufficient in step 2 to judge one of the six memory-mapped regions in the memory map of FIG. 1.

With this conventional processor which sequentially performs the above steps 1 to 3 as the EX stage, however, it is difficult to increase the operating frequency because the time taken by the EX stage cannot be shortened to less than the total operating time taken by steps 1–3.

This operating time taken by steps 1 to 3 involves the following delays. In step 1, an adder that adds a base address and an offset address causes a delay. In step 2, an address decoder that decodes the highest-order eighteen bits out of a 32-bit address causes another delay. In step 3, another delay is caused between the access control circuit (i.e., a memory controller) receiving the results of the instruction decoding and the space judgement, and the memory controller initializing control signals in accordance with the access mode that has been set.

Of these delays, the delay in step 2 gets longer as the number of bits to be decoded by the address decoder increases. This is because the address decoder requires a plurality of circuit elements which involve a higher number of stages to decode an address of a higher number of bits. As a result, the time required for step 2 of the address space judgement gets longer.

For the example memory map shown in FIG. 1, the highest eighteen bits of the 32-bit address needs to be compared with the highest eighteen bits of an address of each memory-mapped region (or a boundary between two memory-mapped regions) to detect whether they are the same, and therefore a circuit as an address decoder to perform this operation are necessary. In theory, it would be sufficient for this address decoder to have a construction which involves two decoding stages by containing at least eighteen AND circuits having two input terminals and an AND circuit having eighteen input terminals that receive the outputs of the eighteen AND circuits and performing a logical AND operation. In reality, however, the address decoder needs to have a circuit construction with more than two decoding stages because a logical circuit such as the address decoder in an LSI is usually built by combining circuits of the same type such as NAND circuits having two input terminals, or NOR circuits having two input terminals.

SUMMARY OF THE INVENTION

The object of the present invention is to provide a processor having the high operating speed by reducing a time taken to execute a memory access instruction.

The above object can be achieved by a processor that accesses a plurality of regions allocated to memory. The processor includes: a judging unit for judging which region is accessed based on an access address; an assuming unit for assuming which region is accessed based on the access address, the assuming unit producing an assumption result faster than the judging unit produces a judgement result; an accessing unit for starting access based on the assumption result; a detecting unit for detecting a disagreement between the judgement result and the assumption result; and a control unit for stopping the access that has been started if the detecting unit has detected the disagreement, and controlling the accessing unit to perform another access based on the judgement result.

With this construction, the judgement by the judging unit is made in parallel with the assumption by the assuming unit. Without waiting for the judging unit to complete the judgement, the accessing unit starts access based on the result of the assumption by the assuming unit. When the judgement result and the assumption result match, the accessing unit continues the access. When the two results disagree, the accessing unit cancels the access, and starts another access based on the judgement result. Accordingly, a time required to execute a memory access instruction can be reduced when the judgement result and the assumption result match, so that the operating speed of the processor can be increased.

Here, the access address may be in an address space that contains a first region and a second region, and the first region may contain a first subregion and a second subregion that are allocated respectively to a first memory element and a second memory element. By decoding M bits of the access address, the judging unit may judge which region, out of at least the first subregion, the second subregion, and the second region, is accessed. By decoding N bits, wherein N is smaller than M, of the access address, the assuming unit may judge which region, out of at least the first region and the second region, is accessed, and may assume that a region corresponding to the first memory element is accessed when judging that the first region is accessed.

For this construction, the assuming unit only needs to identify at least the first region and the second region without needing to identify the first subregion and the second subregion. This allows the assuming unit to only decode N bits, so that this decoding can be performed faster.

Here, when the assuming unit has judged that the first region is accessed and the judging unit has judged that a region which is not the first subregion is accessed, the detecting unit may detect the disagreement.

To detect the stated case as the disagreement, the detecting unit only needs to have a simple logic circuit, and so can quickly detect the disagreement.

Here, the above processor may further include an address calculating unit for calculating the access address according to operands of a memory access instruction, and the judging unit and the assuming unit may decode M bits and N bits, respectively, of the calculated access address, wherein N is smaller than M.

For this construction, the assuming unit can make the assumption faster than the judging unit makes the judgement although the assuming unit and the judging unit start the decoding simultaneously.

Here, the above processor may further include an address calculating unit for calculating the access address according to operands of a memory access instruction. By decoding the calculated access address, the judging unit may make a judgement. By decoding data shown as an operand of the memory access instruction, the assuming unit may make an assumption.

With this construction, the assuming unit decodes the operand data according to which the address calculating unit has not performed calculation yet. Accordingly, the assumption by the assuming unit can be made in parallel with this address calculation, so that the assuming unit can output the result of the assumption earlier.

The above object can be also achieved by a processor that operates in a pipeline consisting of at least an execution stage where the processor calculates an access address designated by a memory access instruction and a memory access stage where the processor accesses the calculated access address, the memory access stage immediately following the execution stage. The processor include: a judging unit for judging which region is accessed by decoding M bits of the access address in the execution stage; an assuming unit for assuming which region is accessed by decoding N bits, wherein N is smaller than M, of the access address in the execution stage, the assuming unit producing an assumption result faster than the judging unit produces a judgement result, a detecting unit for detecting, in the execution stage, a disagreement between the judgement result and the assumption result; an accessing unit for starting access in the memory access stage based on the assumption result when the detecting unit has detected no disagreement; and a pipeline control unit for extending the memory access stage when the detecting unit has detected the As disagreement, wherein the accessing unit performs access based on the judgement result in the extended memory access stage.

With this construction, the judgement by the judging unit is made in parallel with the assumption by the assuming unit in the execution stage. In the next memory access stage, the accessing unit starts access based on the result of the assumption made by the assuming unit. If the judgement result by the judging unit and the assumption result match, the accessing unit continues the access. If the two results disagree, the accessing unit cancels the access, and starts another access based on the judgement result in the memory stage that has been extended. Accordingly, a necessary processing time within the execution stage can be reduced, and so the operation clock frequency of the processor can be increased.

Here, the above processor may further include: two operand registers that store, in the execution stage, a base address and an offset address that are designated in the memory access instruction; and an address calculating unit for calculating the access address by adding the base address and the offset address in the two operand registers; and an operand selecting unit for selecting the base address outputted from one of the two operand registers, wherein the judging unit decodes M bits of the calculated access address and wherein the assuming unit decodes N bits of the base address that has been selected by the operand selecting unit.

Here, the accessing unit may include: a result selecting unit for selecting the assumption result in the execution stage, and selecting the judgement result in the memory access stage only when the detecting unit has detected the disagreement; an access control unit for generating, in the execution stage, a plurality of first control signals used for a first memory access based on the selected assumption result, and generating, in the memory access stage, a plurality of second control signals used for a second memory access based on the selected judgement result when the detecting unit has detected the disagreement; and an access control register for storing either the plurality of the first control signals or the plurality of the second control signals, and outputting either the first control signals or the second control signals to the first memory element and the second memory element in the memory access stage, wherein when the detecting unit has detected the disagreement, the access control register is reset.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 12 shows the timing in detail with which the processor of the same embodiment processes a memory access instruction in the EX stage and the MEM stage when results of the first and second space judgements match; and FIG. 13 shows the timing in detail with which the processor processes a memory access instruction in the EX stage and the MEM stage when results of the first and second space judgements disagree.

DESCRIPTION OF THE PREFERRED EMBODIMENTS

First Embodiment
Overview of the Invention

Figure 3:
FIG. 3 shows the construction of a pipeline for a processor of the first embodiment according to the present invention.

FIG. 3 shows a pipeline construction of a processor according to embodiments of the present invention. The present processor is a pipeline processor that performs pipeline processing in the following five stages shown in the figure: an IF stage; an ID stage; an EX stage; and a WB stage. In the IF stage, the present processor fetches an instruction from an instruction memory unit. In the ID stage, the processor decodes the fetched instruction. In the EX stage, if the decoded instruction is a memory access instruction, such as a load instruction or a store instruction, the processor calculates an effective address. If the decoded instruction shows an operation other than memory access, the processor executes the operation. In the WB stage, the processor writes the result of the operation into a register.

Figure 4:
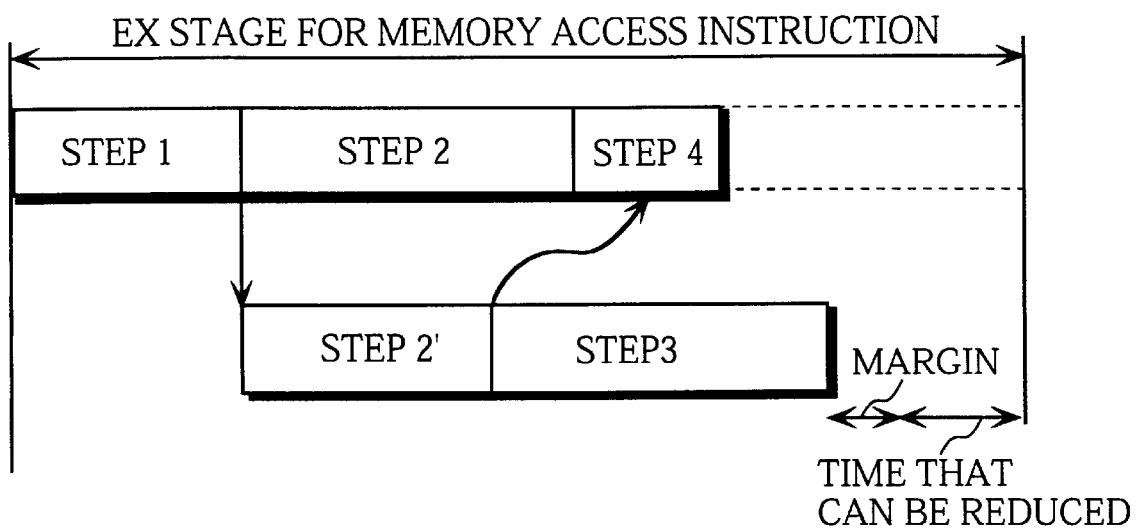
FIG. 4 shows operation contents in the EX stage when the processor of the same embodiment executes a memory access instruction.

FIG. 4 shows the operation content of the EX stage when the present processor processes a memory access instruction. In this case, the processor performs the following steps: step 1 for calculating a memory address (that may be also called an access address); step 2 for performing a first space judgement; step 2' for performing a second space judgement; step 3 for setting an access mode; and step 4 for detecting a disagreement.

In step 1, the processor obtains an effective memory address by adding an offset address and a base address which are designated by the memory access instruction. In step 2, the processor decodes the obtained memory address to judge which of the memory-mapped regions composed of RAM regions, ROM regions, and I/O interface regions the memory address specifies. For this first space judgement, the processor judges each memory-mapped region properly in accordance with the memory map. In step 2', the processor decodes several bits of the memory address that has been obtained in step 1 to roughly and quickly judge which memory-mapped region is specified by the memory address. This process therefore makes an assumption as to which of the RAM unit 102, the ROM unit 103, and the I/O interface 104 should be accessed, and is not a proper judgement. In step 3, the processor sets an access mode in a circuit that controls memory access based on the result of the second space judgement in step 2'. The access mode shows information such as an access data size, an access position in a 32-bit area to be accessed (hereafter an access position) when the access data size is smaller than 32 bits, and whether the access is for a read or a write. In step 4, the processor detects whether the first and second space judgements indicate different memory-mapped regions (i.e., whether there is a disagreement).

Figure 5:
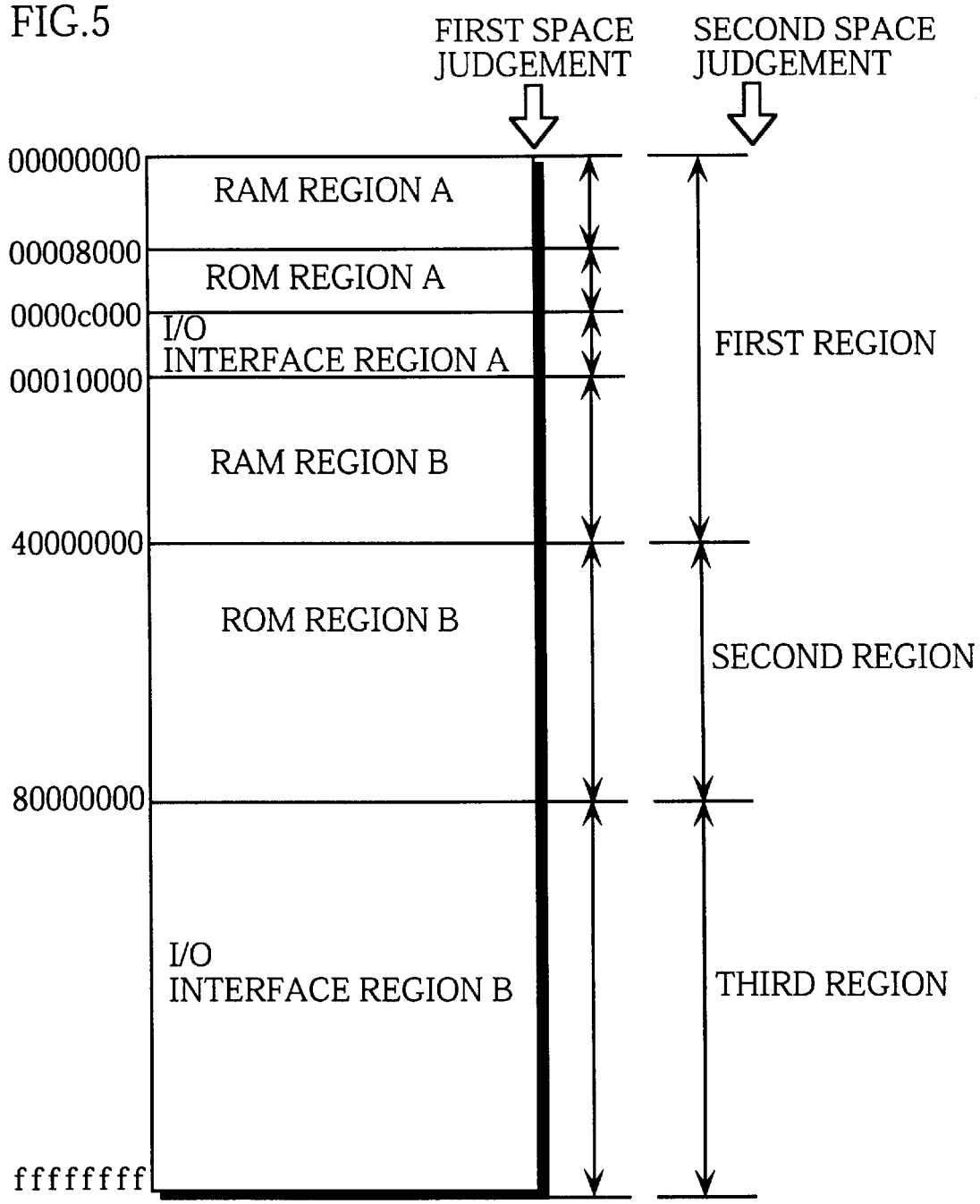
FIG. 5 shows example memory-mapped regions identified by the first space judgement and the second space judgement.

FIG. 5 shows examples of memory-mapped regions that can be identified by the first space judgement and the second space judgement. When the highest-order eighteen bits of the 32-bit address are decoded for the first space judgement, a memory-mapped region can be properly identified in accordance with the memory map. On the other hand, when only the highest-order two bits of the address are decoded for the second space judgement, the processor can identify the memory-mapped region as one of three regions from the first region to the third region.

Following this, when the first and second space judgements identify the same memory-mapped region (i.e., there is no disagreement) in step 4 in the EX stage, the processor starts memory access in accordance with the set access mode as soon as the control flow moves to the next MEM stage. On the other hand, when a disagreement is detected in step 4, the processor extends the MEM stage by one cycle, and performs access in the second cycle in the MEM based on the result of the first space judgement.

Figure 1:
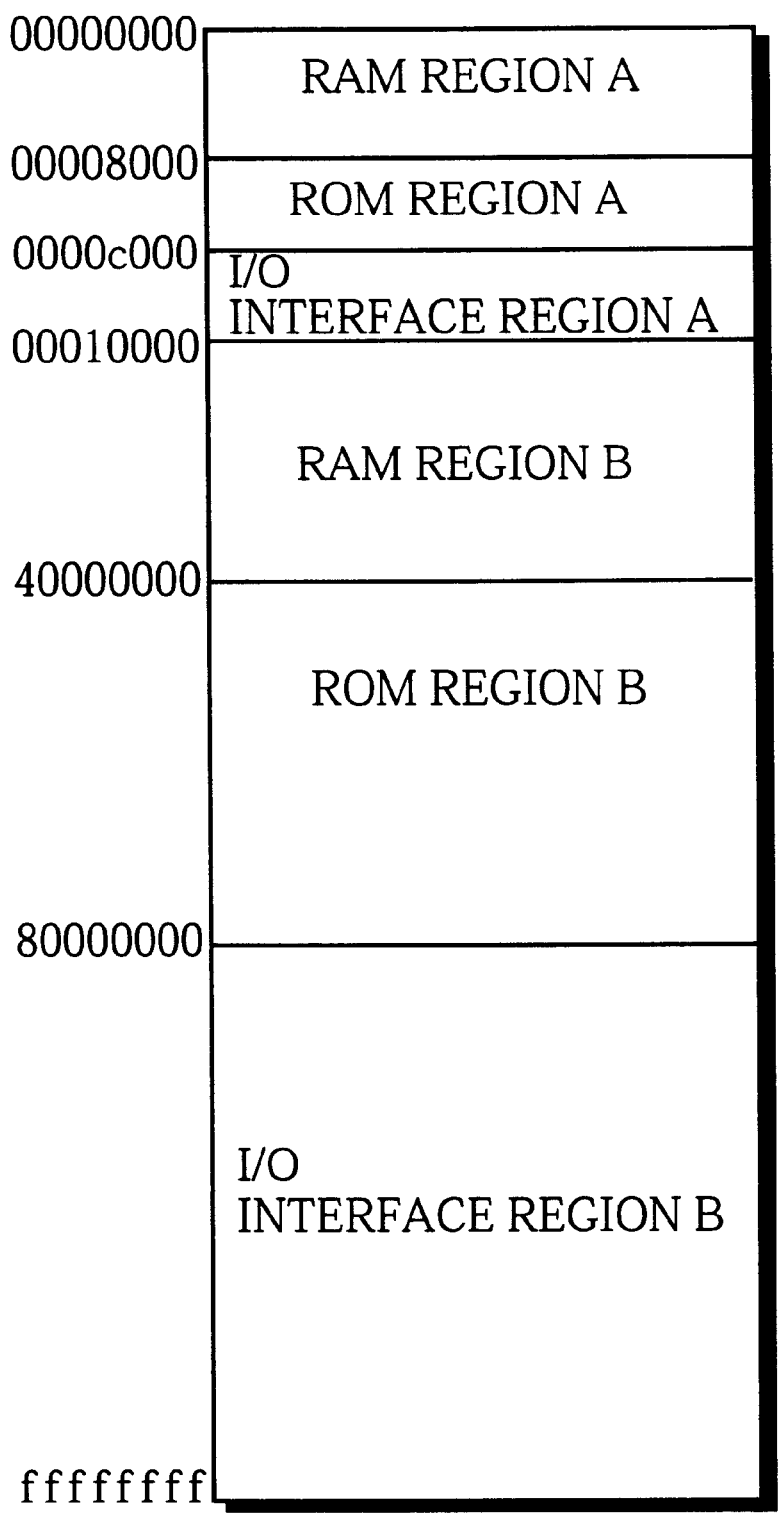
FIG. 1 shows an example memory map.
Figure 2:
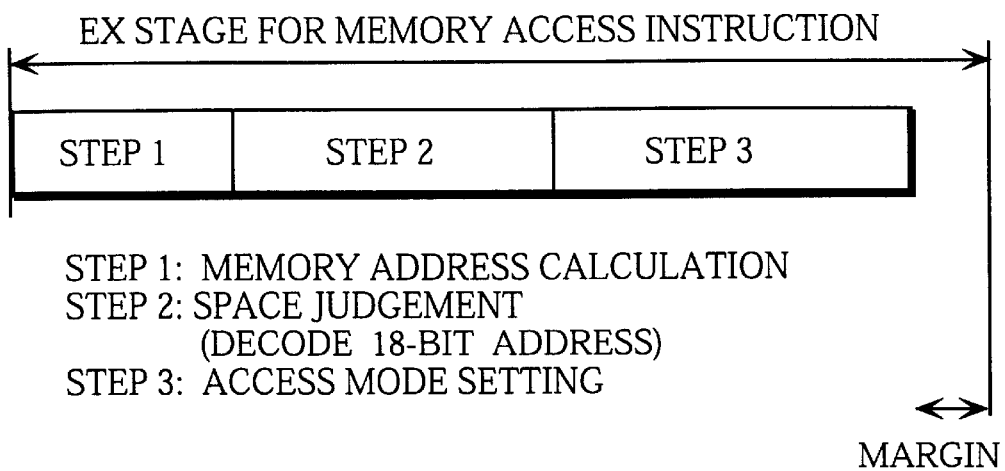
FIG. 2 shows operation contents in the EX stage when the conventional processor executes a memory access instruction.

As has been described, the present processor performs steps 2 and 4 in parallel with steps 2' and 3 so that less time is taken to process a memory access instruction within the EX stage than in a conventional EX stage shown in FIG. 2. This allows the cycle for the EX stage to be shortened, so that the frequency of the processor can be increased.

Processor Construction

Figure 6:
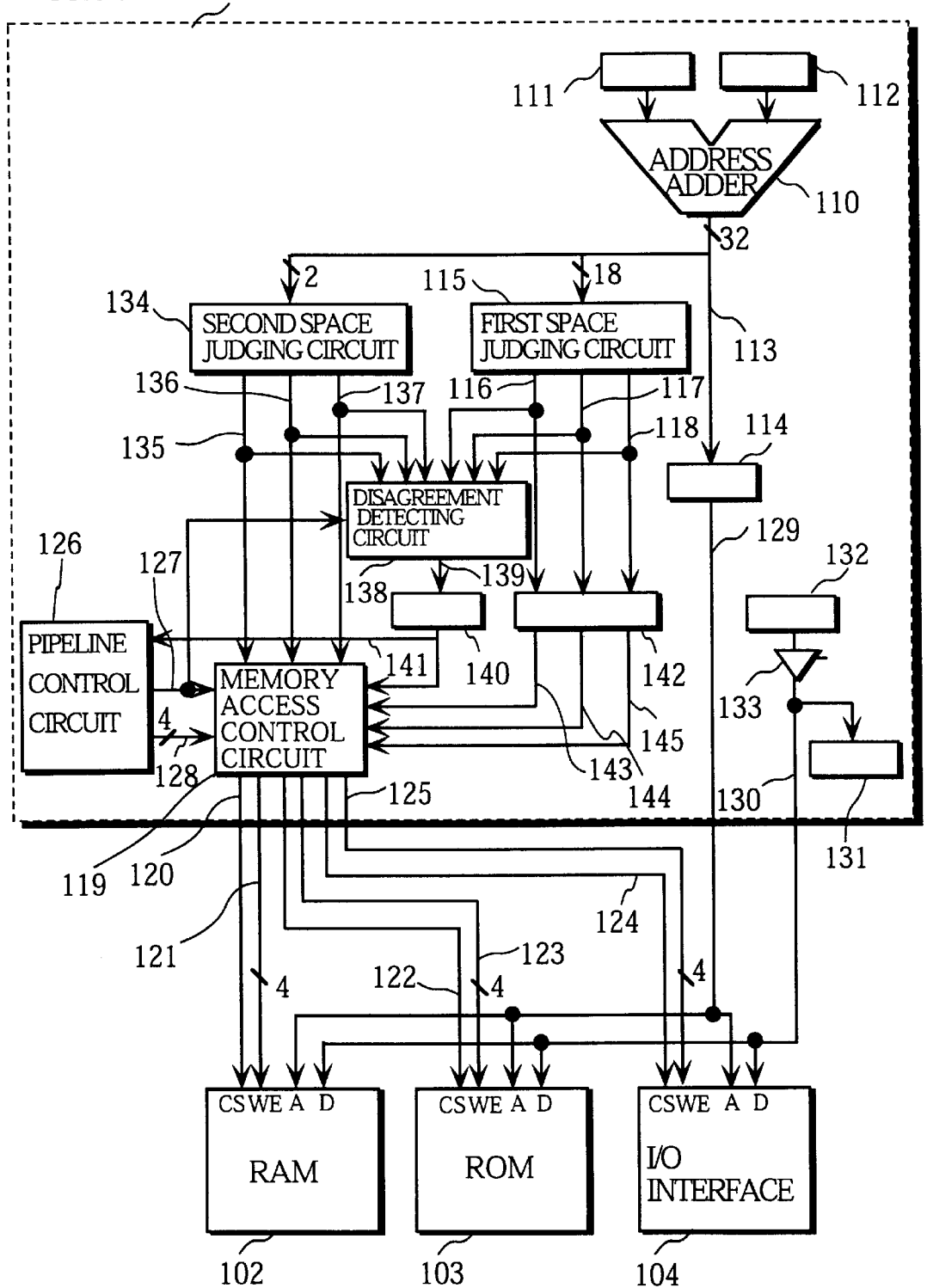
FIG. 6 is a block diagram showing a construction of principal parts of the processor and units such as memory units.

FIG. 6 is a block diagram showing a construction of principal parts of the above processor and units such as memory units. The processor 101 operates in the five-stage pipeline shown in FIG. 3, but this figure only shows the parts of the processor 101 related to the EX stage and the MEM stage, and does not show parts related to the IF, ID, and WB stages since conventional constructions can be used.

As shown in the figure, the processor 101 is connected to a RAM unit 102, a ROM unit 103, and an I/O interface 104, and comprises the following elements: an address adder 110; operand registers 111–112; an address register 114; a first space judging circuit 115; a memory access control circuit 119; a pipeline control circuit 126; a read data register 131; a write data register 132; a tri-state buffer 133; a disagreement detecting circuit 138; a disagreement signal register 140; and a space judgement register 142.

The processor 101 supports the following three addressing modes to specify an effective address for a memory access instruction: a 32-bit absolute addressing mode; a 16-bit absolute addressing mode; and a register-relative addressing mode. In the 32-bit and 16-bit absolute addressing modes, the effective address is specified by a 16- or 32-bit immediate value given as an operand of the memory access instruction. In the register-relative addressing mode, an effective address is specified by adding a value in a register and an immediate value used as an offset.

Regions in the RAM unit 102, the ROM unit 103, and the I/O interface 104 are mapped in the memory mapped I/O method into the address space composed of 32-bit addresses as shown in FIG. 5. In order to effectively use a 64-KB address space which consists of addresses "00000000" to "0000ffff" and can be accessed in the 16-bit absolute addressing mode, certain parts of the RAM unit 102, the ROM unit 103, and the I/O interface 104, such as a RAM region A, a ROM region A, and an I/O interface region A, are mapped to the 64-KB address space. Since each memory-mapped region A has a limited size of less than 64 KB, a RAM region B, a ROM region B, and an I/O interface region B, which can store larger amounts of data and instructions and are the remaining parts of the RAM unit 102, the ROM unit 103, and the I/O interface 104, are mapped to an address space consisting of addresses "00010000" to "ffffffff".

The address adder 110 is a 32-bit adder. As soon as the control flow moves the EX stage, the address adder 110 adds values which have been set in the operand registers 111–112 as a result of a memory access instruction having been decoded in the ID stage, and generates a memory address 113. In the operand register 111, an immediate value designated by an operand of the memory access instruction is set in the ID stage in any one of the above addressing modes being used. In the operand register 112, a "00000000" value is set in the 32-/16-bit absolute addressing mode, and a value in a register designated by an operand of the memory access instruction is set in the register-relative addressing mode.

The address register 114 latches the memory address 113 generated by the address adder 110 as soon as the control flow moves to the MEM stage, where the latched memory address 113 is used to access one of the RAM unit 102, the ROM unit 103, and the I/O interface 104.

The first space judging circuit 115 decodes the highest-order eighteen bits of the memory address 113 generated by the address adder 110, judges which of the memory-mapped regions in the address space is specified by the memory address 113, and outputs first signals 116–118 to show which of the RAM unit 102, the ROM unit 103, and the I/O interface 104 is accessed. The first signal 116, 117, or 118 is made active (i.e., high) when the judged memory-mapped region corresponds to the RAM unit 102, the ROM unit 103, or the I/O interface 104, respectively. The first signals 116–118 are therefore hereafter called the first RAM signal 116, the first ROM signal 117, and the first I/O signal 118.

In more detail, the first RAM signal 116 becomes active when the memory address 113 is in a range A1 below.

Range A1=addresses "00000000" to "00007fff" showing the RAM region A, and addresses "00010000" to "3fffffff" showing the RAM region B.

The first ROM signal 117 becomes active when the memory address 113 is in a range A2 below.

Range A2=addresses "00008000" to "0000bfff" showing the ROM region A, and addresses "40000000" to "7fffffff" showing the ROM region B.

The first I/O signal 118 becomes active when the memory address 113 is in a range A3 below.

Range A3=addresses "0000c000" to "0000ffff" showing the I/O interface region A, and addresses "80000000" to "ffffffff" showing the I/O interface region B.

The above first signals 116 to 118 are outputted to the disagreement detecting circuit 138, and latched by the space judgement register 142 as soon as the control flow moves to the MEM stage. When the MEM stage starts, the space judgement register 142 outputs the latched first signals as space access signals, which consist of a first RAM signal 143, a first ROM signal 144, and a first I/O signal 145.

By decoding the highest eighteen bits of the memory address 113 in this way, the first space judging circuit 115 can judge which of the memory-mapped regions composed of the RAM regions A–B, the ROM regions A–B, and the I/O interface regions A–B the memory address 113 specifies. The judged memory-mapped region therefore shows not only a memory-mapped region to be accessed but also an element type of the access region. The first space judging circuit 115, however, requires more time to make the first space judgement, which starts when the circuit 115 receives the memory address 113 and ends when it outputs first signals 116–118, than the second space judging circuit 134 takes to make its judgement. This is because delays occur in the circuits of the first space judging circuit 115 in a higher number of decoding stages for the reason described earlier.

The second space judging circuit 134 decodes the highest-order two bits of the memory address 113 which has been generated by the address adder 110, and then "roughly" judges which of the memory-mapped regions in FIG. 5 is specified by the memory address 113. The second space judging circuit 134 decodes only the highest-order two bits of the memory address 113, and so can only identify one of the first to third regions in FIG. 5, instead of the six memory-mapped regions shown in the figure. The second space judging circuit 134 makes the following signals active (i.e., high) when making the second space judgement as follows: a second RAM signal 135 when judging the first region as being specified; a second ROM signal 136 when judging the second region as being specified; and a second I/O signal 137 when judging the third region as being specified.

In more detail, the second RAM signal 135 becomes active when the memory address 113 is in a range between address "00000000" to the address "3fffffff" showing the first region, and the second ROM signal 136 becomes active when the memory address 113 is in a range between the address "40000000" to the address "7fffffff" showing the second region. The second I/O signal 137 becomes active when the memory address 113 is in a range between the address "80000000" to the address "ffffffff" showing the third region.

The second space judging circuit 134 outputs these second signals 135–137 to the memory access control circuit 119 and the disagreement detecting circuit 138.

Among the above second signals 135–137, the second ROM signal 136 and the second I/O signal 137 always show the same contents as the first judgement result of the first space judging circuit 115. This is because the second region and the third region are equal to the ROM region B and the I/O interface region B, respectively. The second ROM signal 136 and the second I/O signal 137 which are made active therefore indicate that the ROM unit 103 and the I/O interface 104 should be accessed.

On the other hand, the second RAM signal 135, which is made active by the second space judging circuit 134, does not necessarily show that the RAM unit 102 should be accessed, which is to say, it may show that the ROM unit 103 or the I/O interface 104 should be accessed. The second RAM signal 135 therefore does not show an element type of a region to be accessed. This is because the first region consists of the RAM region A, the ROM region A, the I/O interface region A, and the RAM region B, as shown in the memory map of FIG. 5. The second space judging circuit 134 therefore makes the second RAM signal 135 active on the assumption that the RAM unit 102 should be accessed, and so a high level for the second RAM signal 135 only shows such assumption.

The second space judging circuit 134, however, can make the second space judgement, which starts when the circuit 134 receives the memory address 113 and ends when it outputs the second signals 135–137, much faster than the first space judging circuit 115 makes its judgement because the second space judging circuit 134 decodes only the highest-order two bits of the memory address 113.

The disagreement detecting circuit 138 detects whether results of the first and second space judgements match. This is to say, the disagreement detecting circuit 138 compares the first signals 116–118, which are outputted from the first space judging circuit 115, with the second signals 135–137, which are outputted from the second space judging circuit 134, to judge whether they show the same element type as the access region. If not, the disagreement detecting circuit 138 makes a disagreement signal 139 active (i.e., high), and outputs it to the disagreement signal register 140.

The disagreement detecting circuit 138 only operates when an access execution signal 127 received from the pipeline control circuit 126 has been made high to show that a memory access instruction to be processed in the EX stage exists. The disagreement signal register 140 latches the disagreement signal 139 at a point where the control flow moves from the EX stage to the MEM stage, where the register 140 outputs the signal 139 to the memory access control circuit 119 as a disagreement signal 141.

In the present embodiment, results of the first and second space judgements can differ only when the second RAM signal 135 is active. Accordingly, it is possible to have the disagreement detecting circuit 138 receive only the first and second RAM signals 116 and 135.

The memory access control circuit 119 sets the access mode, which is used for memory access in the next MEM stage, in the EX stage (more specifically in step 3 of the EX stage shown in FIG. 4) based on the judgement result of the second space judging circuit 134. In the MEM stage, the memory access control circuit 119 starts the memory access according to this access mode. If the disagreement signal 141 is inactive at this point, the memory access control circuit 119 continues to perform the memory access until it completes the access. If the disagreement signal 141 is active, the memory access control circuit 119 cancels the memory access, sets the access mode based on the judgement result of the first space judging circuit 115, and accesses one of the RAM unit 102, the ROM unit 103, and the I/O interface 104 according to the set access mode.

The pipeline control circuit 126 controls switching between stages of the pipeline. As principal operations, the pipeline control circuit 126 receives the result of the memory access instruction decoding in the ID stage, and outputs the access execution signal 127 and write execution signals 128 to the memory access control circuit 119 in the EX stage. When receiving an active disagreement signal 141 in the MEM stage via the register 140 from the disagreement detecting circuit 138, the pipeline control circuit 126 extends the MEM stage by one cycle. The active (high) access execution signal 127 outputted in the EX stage shows that memory access should be performed in the MEM stage. On receiving the active access execution signal 127, the memory access control circuit 119 starts memory access in the following MEM stage and the disagreement detecting circuit 138 starts the detection. The write execution signals 128 show that the memory access to be performed in the MEM stage is for a read or a write, and are four write execution signals WE0–WE3 that correspond to 32 bits (four bytes) for the present embodiment.

The read data register 131 latches, via a bus 130, data that has been read from one of the RAM unit 102, the ROM unit 103, and the I/O interface 104 in the MEM stage when the memory access for a read is performed.

The write data register 132 outputs data, which should be written into the memory, via the tri-state buffer 133 onto the bus 130 in the MEM stage when the memory access for a write is performed.

Construction of Memory Access Control Circuit 119

Figure 7:
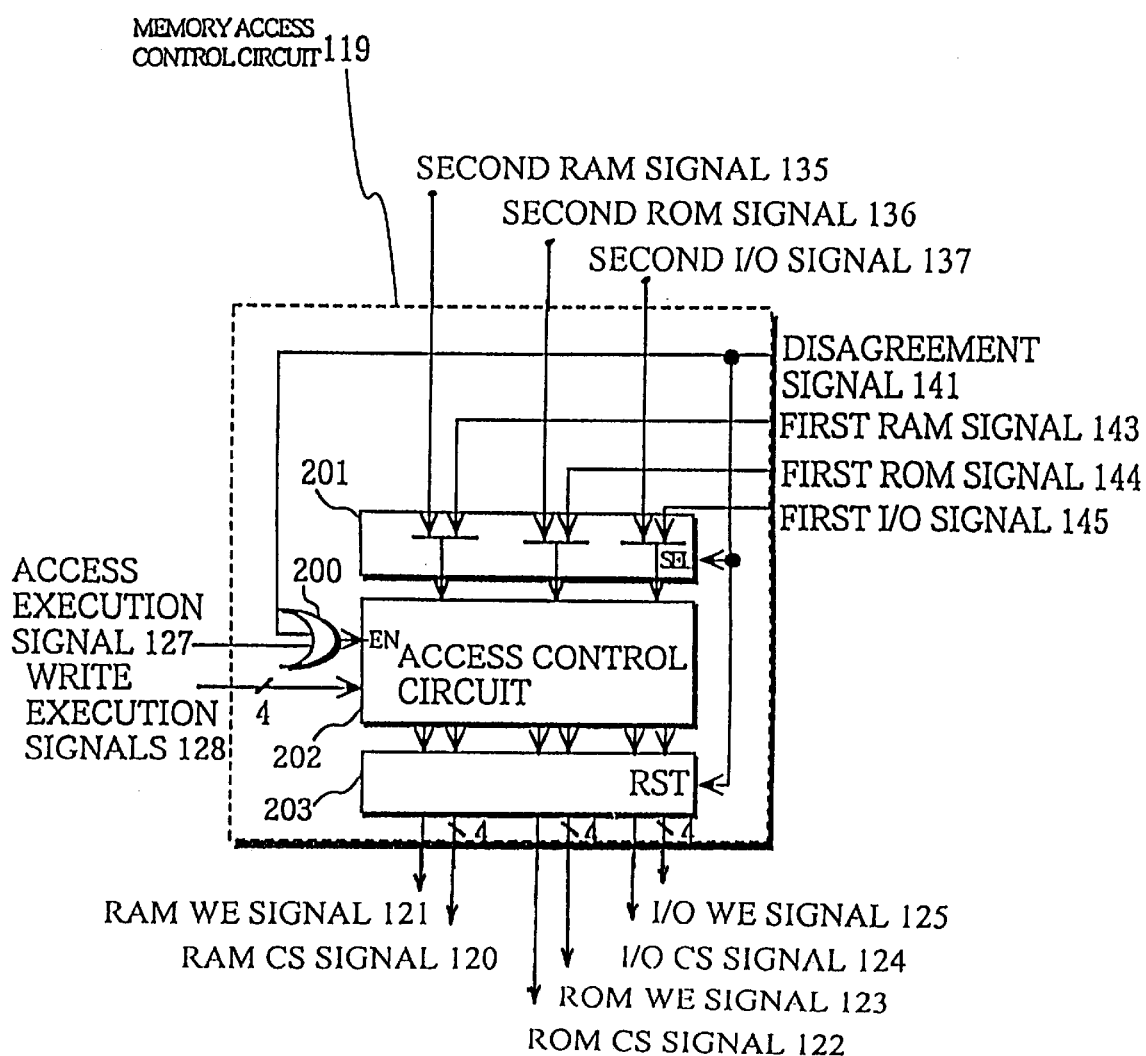
FIG. 7 is a block diagram showing a detailed construction of a memory access control circuit.

FIG. 7 is a block diagram showing a detailed construction of the memory access control circuit 119, which includes the following: an OR circuit 200; a selecting circuit 201; an access control circuit 202; and a memory access control register 203.

The OR circuit 200 receives the access execution signal 127 and the disagreement signal 141 respectively from the pipeline control circuit 126 and the disagreement signal register 140, performs a logical OR on the two signals, and outputs the result of the logical OR to an enable terminal of the access control circuit 202. The access execution signal 127 and the disagreement signal 141 are signals according to positive logic, and active when they are high. The access execution signal 127 enables the access control circuit 202 in the EX stage since the signal 127 is made active in the EX stage when a memory access instruction is processed. The disagreement signal 141 enables the access control circuit 202 in the MEM stage since this signal 141 is made active in the MEM stage for a memory access instruction. The disagreement signal 141 is also received by the pipeline control circuit 126 so that the circuit 126 extends the MEM stage by one cycle when the disagreement signal 141 is active.

The selecting circuit 201 selects the second RAM signal 135, the second ROM signal 136, and the second I/O signal 137 when the disagreement signal 141 is low (i.e., inactive), and selects the first RAM signal 143, the first ROM signal 144, and the first I/O signal 145 when the disagreement signal 141 signal is high. The selecting circuit 201 receives the disagreement signal 141 from the disagreement signal register 140 not in the EX stage but in the MEM stage. As a result, the selecting circuit 201 always selects the second RAM signal 135, the second ROM signal 136, and the second I/O signal 137 in the EX stage, and selects the first RAM signal 143, the first ROM signal 144, and the first I/O signal 145 only in the MEM stage when the disagreement signal 141 is high (i.e., when the results of the first and second space judgements disagree).

The access control circuit 202 sets, in a cycle where its enable terminal is made high, the access mode based on the write execution signals 128 (i.e., signals WE0–WE3) and the signals selected by the selecting circuit 201, and performs memory access in the next cycle. The access control circuit 202 sets the access mode by determining values of control signals that should be outputted by its logic circuits in accordance with the signals that has been selected by the selecting circuit 201, and the write execution signals 128 whose values have been determined. The control signals are then latched by the memory access control register 203 as soon as the control flow moves to the MEM stage, where the register 203 outputs them as a RAM CS (chip select) signal 120, ROM WE0 (write enable)—ROM WE3 signals 121, a ROM CS signal 122, ROM WE0—ROM WE3 signals 123, an I/O CS signal 124, and I/O WE0—IO WE3 signals 125.

The enable terminal of the access control circuit 202 is made high in the following two cases. The first case is when a memory access instruction is processed in the EX stage. In this case, the access control circuit 202 performs memory access in the next MEM stage unless the disagreement signal 141 is made active. The second case is when the disagreement signal 141 becomes active in the MEM stage. In this case, the pipeline control circuit 126 extends the MEM stage by one cycle, and the memory access control circuit 119 sets, in the first cycle in MEM stage, the access mode based on the first RAM signal 143, the first ROM signal 144, and the first I/O signal 145 that have been selected by the selecting circuit 201. In the next cycle in the same MEM stage, the memory access control circuit 119 performs memory access according to the set access mode.

The memory access control register 203 latches the control signals, which are outputted from the access control circuit 202, as soon as the control flow moves from the EX stage to the MEM stage. As soon as the control flow moves to the MEM stage, the memory access control register 203 outputs these control signals. The memory access control register 203 has a reset terminal that receives the disagreement signal 141. On receiving the disagreement signal 141 that was made active, the memory access control register 203 is reset to cancel memory access which the memory access control register 203 has started by outputting control signals.

Memory Access Operations

Figure 8:
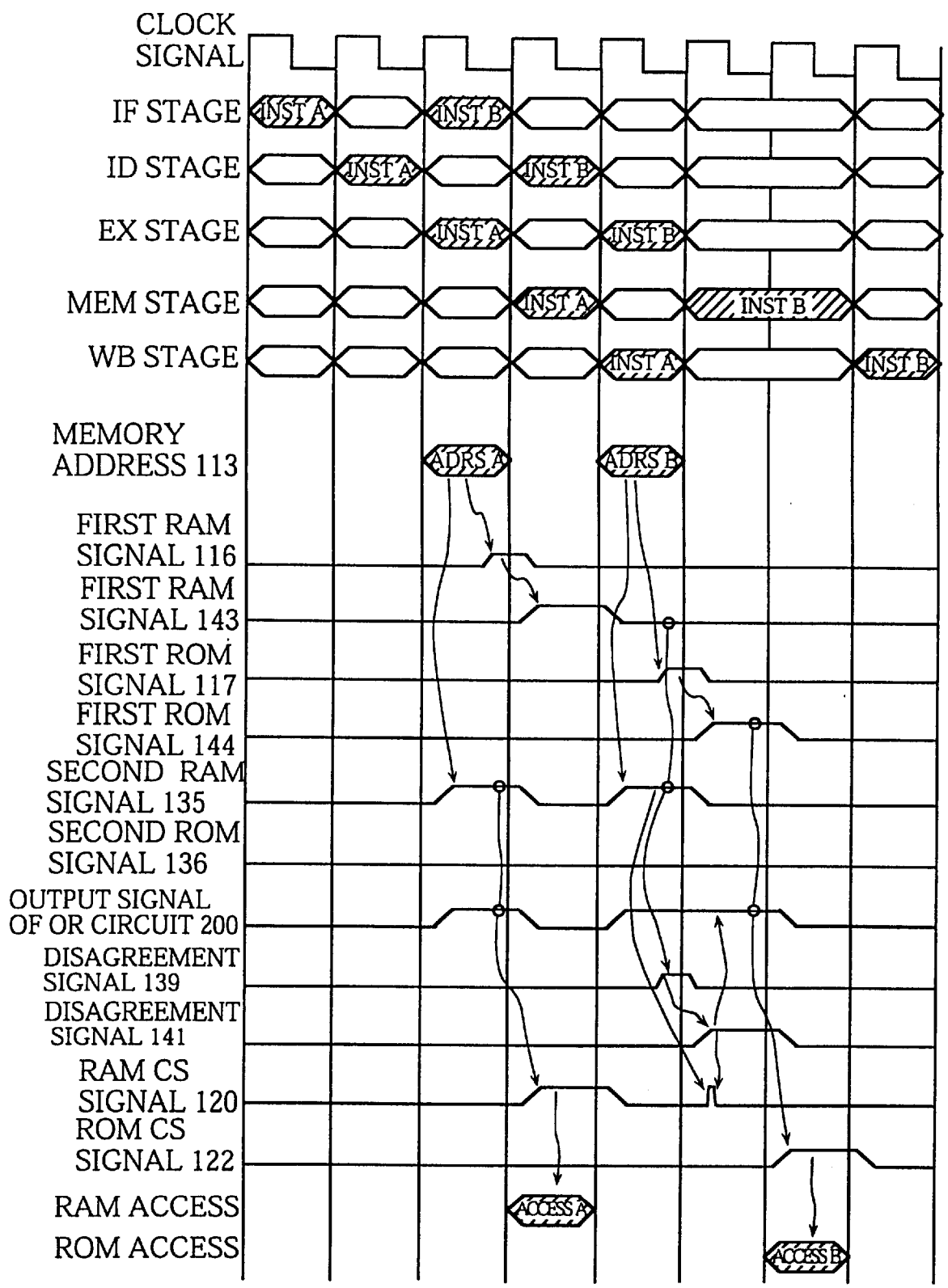
FIG. 8 is a timing chart for pipeline operations to process a memory access instruction.

FIG. 8 is a timing chart showing pipeline operations by the processor 101 for memory access instructions.

The chart shows the timing to process instructions A and B and the following signals and the like in accordance with pipeline stages: the memory address 113; the first RAM signals 116 and 143; the first ROM signals 117 and 114; the second RAM signal 135; the second ROM signal 136; the output signal of the OR circuit 200; the disagreement signals 139 and 141; the RAM CS signal 120; the ROM CS signal 122; a RAM access; and a ROM access.

The instruction A is for accessing data stored in either the RAM region A or the RAM region B, such as when the memory address 113 of "00004000". This chart shows an example in which results of the first and second space judgements match for the instruction A. The instruction B is for accessing the ROM region A, such as when the memory address 113 is "00008000", and the chart shows an example in which the two judgement results do not match for the instruction B.

In the EX stage for the instruction A, both the first and second RAM signals 116 and 135 become active, so that the disagreement signal 139 remains inactive. In the next MEM stage for the instruction A, the RAM CS signal 120 is activated in accordance with the second RAM signal 135, and the RAM unit 102 is accessed.

In the EX stage for the instruction B, both the first ROM signal 114 and the second RAM signal 135 become active so that the disagreement signal 139 also becomes active. In the next MEM stage for the instruction B, the RAM CS signal 120 is activated in accordance with the second RAM signal 135, and access to the RAM unit 102 is prepared. However, this access is canceled by the disagreement signal 141 that is made active. Responding to this active disagreement signal 141, the output from the OR circuit 200 becomes active so that MM stage is extended by one cycle. In the second cycle in the same MEM stage, the ROM CS signal 122 is generated based on the first ROM signal 144, and the ROM unit 103 is accessed.

Case 1: When Results of First and Second Space Judgements Match

Figure 9:
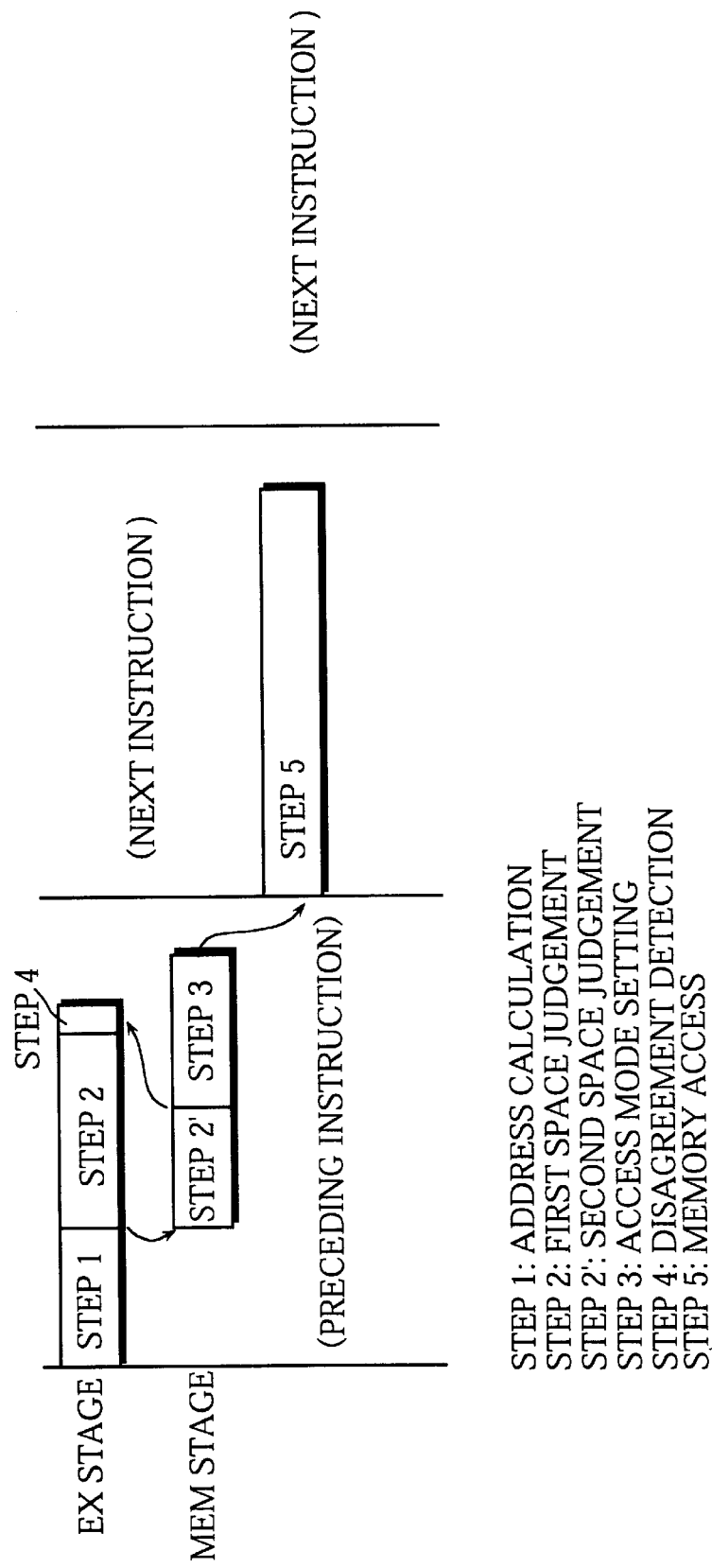
FIG. 9 shows the timing in detail with which the processor processes a memory access instruction in the EX stage and the MEM stage when results of the first and second space judgements match.

FIG. 9 shows the detailed timing in the EX and MEM stages where the instruction A in FIG. 8 is processed.

In the EX stage shown in FIG. 9, the processor 101 performs the following steps. In step 1, the address adder 110 in the processor 101 calculates the memory address 113. In step 2, the first space judging circuit 115 decodes the calculated memory address 113 to make the first space judgement. In step 2', the second space judging circuit 134 decodes the calculated memory address 113 to make the second space judgement. The processor 101 starts steps 2 and 2' in parallel, but the result of the second space judgement in step 2', where the highest-order two bits of the memory address 113 are decoded, can be obtained faster than the result of the first space judgement in step 2 where the highest-order eighteen bits are decoded. In step 3, the memory access control circuit 119 sets the access mode based on the result of the second space judgement.

In step 4, the disagreement detecting circuit 138 receives the results of the first and second space judgements, and compares one result with another to detect a disagreement. When detecting the disagreement, the disagreement detecting circuit 138 makes the disagreement signal 139 active. For the instruction A, both the first and second RAM signals 116 and 135 become active, which means that the same memory-mapped region has been judged as a region to be accessed, so that the disagreement signal 139 remains inactive. This signal 139 is latched in the disagreement signal register 140 as soon as the control flow moves to the next MEM stage, where the register 140 outputs the signal 139.

As has been described, in the EX stage for a memory access instruction, the second space judgement and the access mode setting based on the result of the second space judgement (i.e., steps 2' and 3) are performed in parallel with the first space judgement and detection of the disagreement (i.e., steps 2 and 4). As a result, one cycle of an operation clock signal can be shortened by a time equal to difference in times taken by steps 2 and 2'.

In step 5 in the MEM stage, the memory access control circuit 119 starts the memory access according to the second RAM signal 135, that is, the access mode that has been set in step 3. Since the disagreement signal 141 outputted by the disagreement signal register 140 is inactive as a result of the first and second space judgement results having matched, the above memory access completes in the same cycle. This completes the MEM stage, and so the control flow moves to the next cycle for the WB stage.

Case 2: When Results of First and Second Space Judgements Disagree

Figure 10:
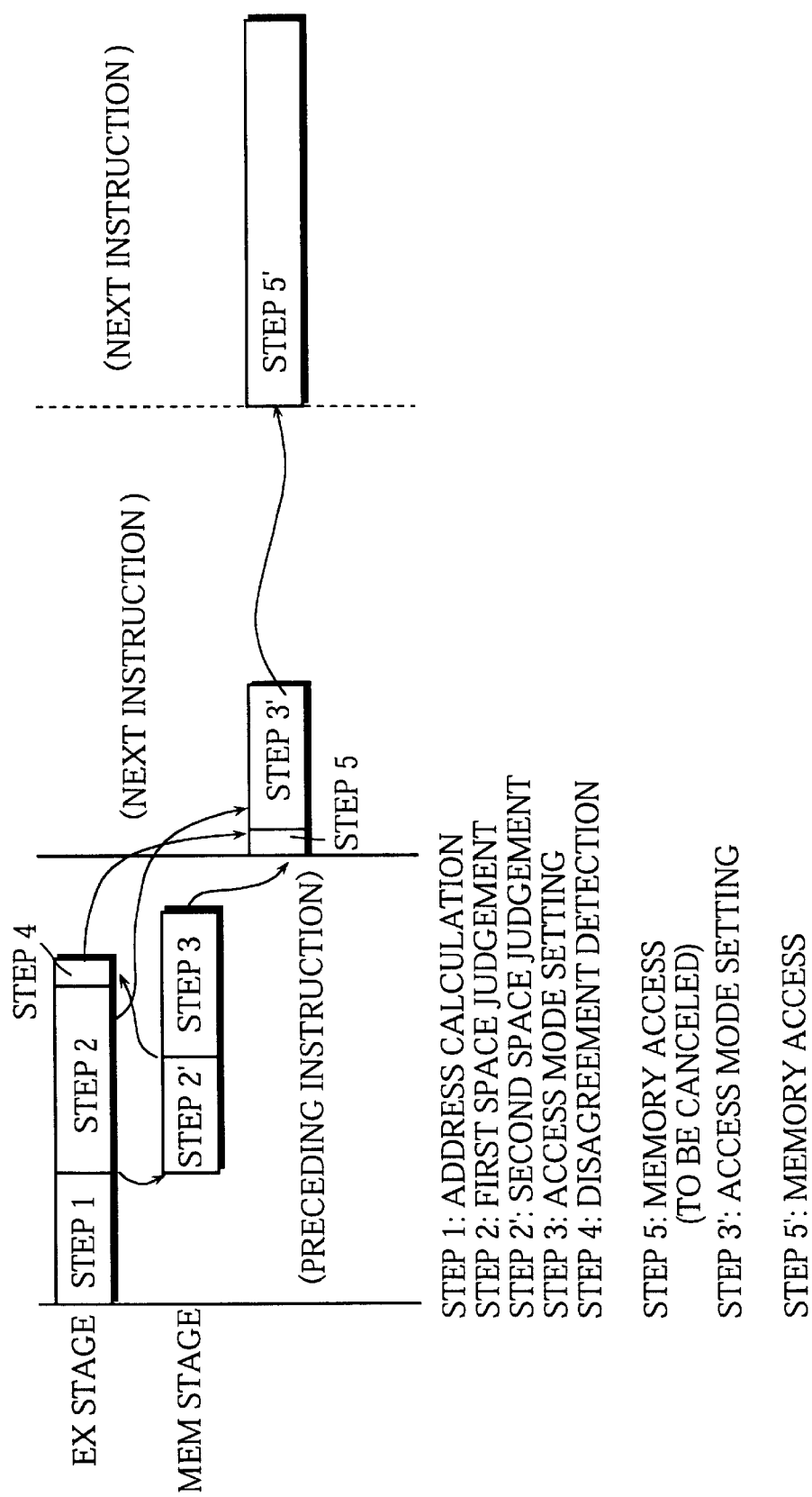
FIG. 10 shows the timing in detail with which the processor processes a memory access instruction in the EX stage and the MEM stage when results of the first and second space judgements disagree.

FIG. 10 shows the detailed timing in the EX and MEM stages where the instruction B in FIG. 8 is processed.

In the EX stage shown in FIG. 10, the processor 101 performs steps 1, 2, 2', 3, and 4 as has been explained for FIG. 9. For the instruction B, however, the first ROM signal 117 and the second RAM signal 135 become active so that the disagreement signal 139 becomes active. This signal 139 is latched in the disagreement signal register 140 as soon as the control flow moves to the next MEM stage, where the register 140 outputs the disagreement signal 141 as the signal 139.

As soon as the control flow moves to the MEM stage in the figure, the pipeline control circuit 126 receives the disagreement signal 141 that is made active, and so extends the MEM stage by one cycle.

In the first cycle in the MEM stage, the memory access control circuit 119 starts memory access according to the access mode set in step 3. However, as the disagreement signal 141 outputted by the disagreement signal register 140 is active, the memory access control register 203 is reset so that active control signals, such as the RAM CS signal 120, become inactive. As a result, the memory access that has been started is canceled in step 5 as shown in the figure. In the next step 3', the access control circuit 202 receives the active disagreement signal 141 via its enable terminal from the OR circuit 200. As a result, the access control circuit 202 sets the access mode based on the first space judgement result.

In step 5' in the second cycle in MEM stage, the memory access control circuit 119 performs memory access according to the access mode that has been set in step 3'.

As has been described, when the processor 101 performs steps 2' and 3 in parallel with steps 2 and 4, a substantial processing time taken in the EX stage (i.e., the longer of: a time taken by steps 1→2'→3; and a time taken by steps 1→2→4) becomes shorter than the time taken by the EX stage of the conventional processor, as shown in FIG. 4. This allows a cycle time to be reduced by this shortened time, and raises operation clock frequency of a processor.

For the above operations, the MEM stage to process a memory access instruction is extended by one cycle when the first and second space judgements in steps 2 and 2' do not match. However, as the operation clock frequency is increased for every cycle for every instruction, the advantage of the frequency being raised outweighs the disadvantage of the MEM stage being extended.

The memory map in FIG. 5 is desirable when the RAM regions A and B in the first region are accessed more often than the ROM region A and the I/O interface region A in the same first region. If the I/O interface region A is accessed more often than the RAM regions A and B, however, this memory map in FIG. 5 is not desirable. In this case, on judging that the first region is specified by the memory address 113, the second space judging circuit 134 may assume the first region is a memory-mapped region for the I/O interface 104 and make the second I/O signal 137 active.

Second Embodiment
Processor Construction

Figure 11:
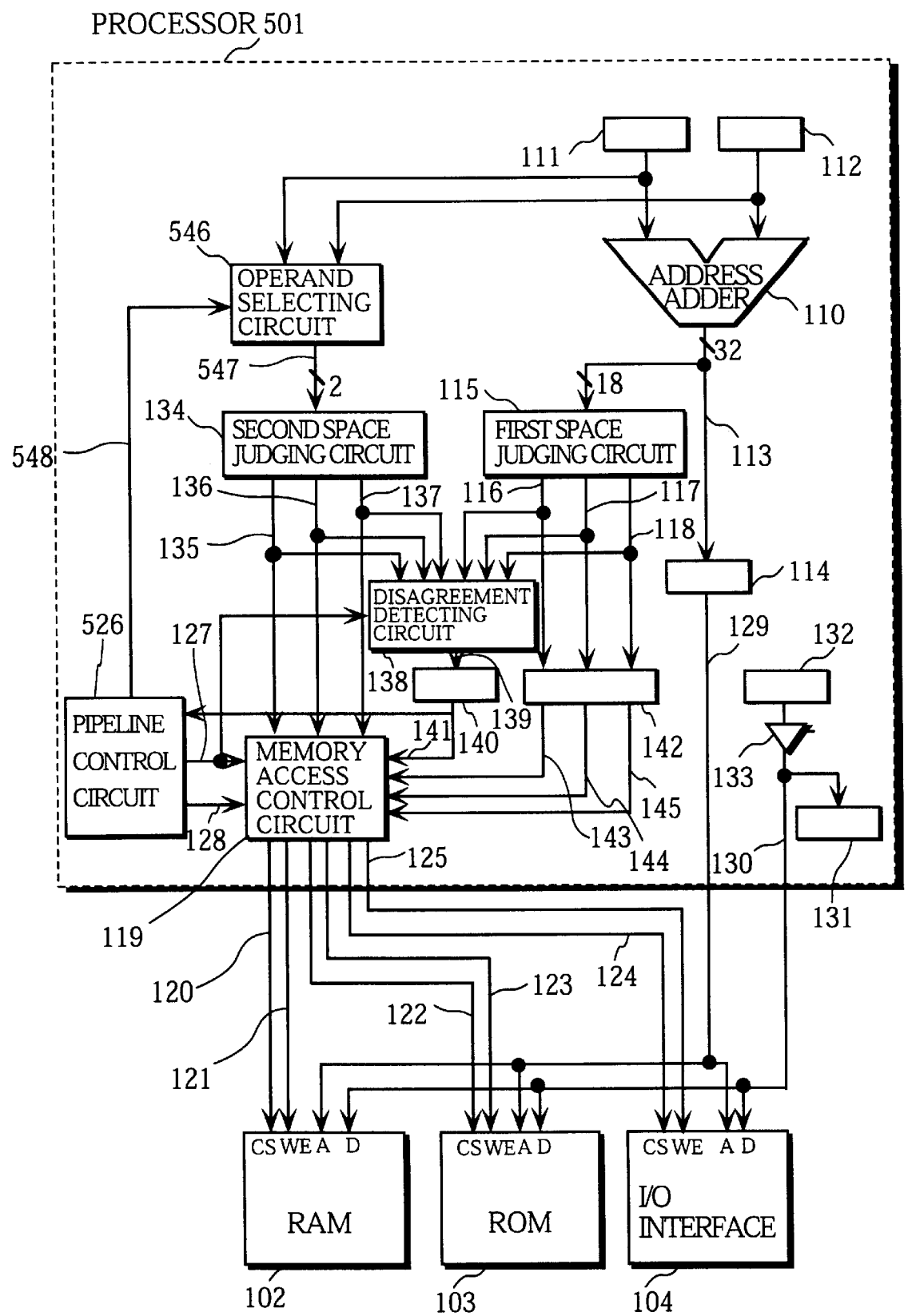
FIG. 11 is a block diagram showing a construction of principal parts of the processor and units such as memory units according to the second embodiment.

FIG. 11 is a block diagram showing a construction of principal parts of the processor 501 according to the present embodiment and units such as memory units. The present processor 501 differs from the processor 101 in FIG. 6 in that the processor 501 newly includes an operand selecting circuit 546, and a pipeline control circuit 526 instead of the pipeline control circuit 126. The present processor 501 is provided with the same memory map and the addressing modes as the processor 101.

Among the elements in FIG. 11, elements which are the same as shown in FIG. 6 are assigned the same reference numbers as shown in FIG. 6, and will not be explained. The following explanation focuses on elements of the processor 501 which are different from those in FIG. 6.

The operand selecting circuit 546 receives the highest-order two bits of an output signal from both the operand register 111 and the operand register 112, and selects two bits outputted from either the operand register 111 or 112 in accordance with a select control signal 548 inputted from the pipeline control circuit 526. The operand selecting circuit 546 then outputs the selected two bits to the second space judging circuit 134. The operand selecting circuit 546 selects the highest-order two bits outputted from the operand register 111 when the select control signal 548 is, for instance, high, and selects the two bits from the operand register 112 when the signal 548 is low, with this being the case for the present embodiment.

The pipeline control circuit 526 differs from the pipeline control circuit 126 in that the present circuit 526 additionally outputs the select control signal 548. More specifically, the pipeline control circuit 526 refers to a result of a memory access instruction decoding performed in the ID stage, and outputs the select control signal 548 in the EX stage after making it high when the memory access instruction uses the 32-/16-bit absolute addressing mode, or low when the access instruction uses the register-relative addressing mode.

As a result, in the EX stage when a memory access instruction in the 32-bit absolute addressing mode is to be processed, the highest-order two bits out of a 32-bit immediate value, which is designated in the memory access instruction and stored in the operand register 111, are outputted from the operand selecting circuit 546 to the second space judging circuit 134. On the other hand, when the memory access instruction in the 16-bit absolute addressing mode is to be processed, the highest-order two bits in the operand register 111, which stores a 16-bit immediate value at the lower-order side and a value "0000h" at the higher-order side, are outputted from the operand selecting circuit 546 to the second space judging circuit 134. When the memory access instruction in the register-relative addressing mode is processed, the highest-order two bits of register data, which is designated by the access instruction and stored in the operand register 112, are outputted to the second space judging circuit 134.

The second space judging circuit 134 has the same construction as in the first embodiment although the present circuit 134 receives an operand signal 547 instead of the memory address 113. As a result, the circuit 134 makes the second RAM signal 135, the second ROM signal 136, and the second I/O signal 137 high respectively when the operand signal 547 shows a value (an address) in the following ranges: a range from the address "00000000" to the address "3fffffff" showing the first region; a range from the address "40000000" to the address "7fffffff" showing the second region; and a range from the address "80000000" to the address "ffffffff" showing the third region. As the second space judging circuit 134 decodes the highest-order two bits stored in either the operand register 111 or 112 before the address adder 110 adds two values in the registers 111 and 112, the circuit 134 can make the second space judgement faster than the circuit 134 of the first embodiment.

Operations of Processor 501

The following describes the processing of the processor 501.

FIGS. 12–13 are timing charts for the EX and MEM stages when a memory access instruction is processed, with FIG. 12 showing the case when the first and second space judgements match and FIG. 13 the case when they do not match.

When the processor 501 processes a memory access instruction in the 32-/16-bit absolute addressing mode in the EX stage, the operand register 111 stores an immediate value which has been obtained in the previous ID stage, and the operand register 112 stores a value "00000000". This means that the memory address 113 outputted from the address adder 110 has the same value as the output from the operand register 111. In response to this 32-/16-bit absolute addressing mode, the pipeline control circuit 526 outputs the select control signal 548 which is made high, so that the operand selecting circuit 546 selects the highest-order two bits of data outputted from the operand register 111, and outputs the selected two bits as the operand signal 547.

As a result, the second space judging circuit 134 receives the same value as the highest-order two bits of the memory address 113 to make the second space judgement in step 2'. This state is the same as in the case when a memory access instruction is processed in the first embodiment, and so the same operations as in the first embodiment are performed for the EX and MEM stages.

However, as can be understood by comparing FIGS. 12–13 with FIGS. 9–10 for the first embodiment, the present processor 501 starts the second space judgement in step 2' earlier in the EX stage than the processor 101 of the first embodiment. This allows the access mode setting in step 3 to end earlier than in the first embodiment, and therefore more time for each cycle can be reduced than in the first embodiment.

On the other hand, when the memory access instruction uses the register-relative addressing mode, the operand register 111 stores, in the EX stage, an immediate value which has been obtained in the previous ID stage, while the operand register 112 stores register data which has been read in the previous ID stage. In response to this register-relative addressing mode, the pipeline control circuit 526 makes the select control signal 548 low and outputs it so that the operand selecting circuit 546 selects the highest-order two bits of the data stored in the operand register 112, and outputs the selected two bits as the operand signal 547 to the second space judging circuit 134. When the second space judging circuit 134 makes the second space judgement using the operand signal 547, the judgement result may differ from the result of the judgement in the first embodiment where the highest-order two bits of the memory address 113 are used. This can happen when the highest-order two bits of the data stored in the operand register 112 specify a memory-mapped region that is not one of the first to third regions specified by the highest-order two bits of a value obtained by adding two values in the operand registers 112 and 111.

However, generating different second space judgement results between the first and second embodiments is not a problem. This is because the first space judging circuit 115 makes the first space judgement that is always correct.

After the second space judgement in step 2', the processing becomes as shown in either FIG. 12 or FIG. 13, depending on whether the results of the first and second space judgements match.

With the processor 501 of the present embodiment, the second space judgement is made using the highest-order two bits of data which is stored in either the operand register 111 or 112 before being inputted to the address adder 110. This is to say, the second space judging circuit 134 can start the second space judgement as soon as the address adder 110 starts the calculation of the memory address 113, so that the circuit 134 can output the result of the judgement much earlier than in the first embodiment. As a result, a substantial time taken by the EX stage to process a memory access instruction can be reduced further, and the operation frequency of the processor can be more improved than in the first embodiment.

Modification Examples

The present invention is not limited to the processors that have constructions described in the first to second embodiments. Possible modification examples are described below.

(A) A memory map for the processor of the present invention is not limited to the memory map shown in FIG. 5 although the above embodiments use the memory map in this figure. For instance, a memory map, in which a memory-mapped region a that can be identified by the second space judgement contains memory-mapped regions b1 and b2 that can be identified by the first space judgement, with the region b1 being allocated to a memory element that is not a memory element of the region b2, can be alternatively regarded as a memory map of the present invention. In other words, with this alternative memory map, the second space judgement specifies the region a that should be specified as the regions b1 and b2 requiring different chip select signals.

(B) In the memory map in FIG. 5, the 32-KB RAM region A (addresses "00000000" to "00008000") and any 32-KB part within the RAM region B (addresses "00010000" to "40000000") may be allocated to the same physical area in the RAM unit 102 such as a 32-KB area at a start in the RAM unit 102.

In the same way, the 16-KB ROM region A (addresses "00008000" to "0000c000") and a 16-KB area from a start of the ROM region B (addresses "40000000" to "40004000") may be allocated to the same physical 16-KB area at a start in the ROM unit 103. The 16-KB I/O interface region A (addresses "0000c000" to "00010000") and a 16-KB area at a start in the I/O interface region B (addresses "80000000" to "80004000") may be allocated to the same physical 16-KB area at a start in the I/O interface 104.

(C) The number of stages of the pipeline of the present invention is not limited to the five stages although the processor 101 and 501 operate in the five-stage pipeline. It is alternatively possible to perform operations of steps 1, 2, 2', 3, 4, and 5 shown in FIG. 9 in the same stage, instead of the two separate stages of the EX and MEM stages. If a disagreement is detected in this integrated stage, the stage may be extended by one cycle.

(D) The processor 101/501 may be a processor that does not perform a pipeline operation although the above embodiments describe the processor 101/501 as a pipeline processor. Unless the processor 101/501 is a pipeline processor, the processor 101/501 executes instructions one by one while usually taking five clock cycles for each instruction. When executing a memory access instruction, the processor 101/501 takes five clock cycles unless the disagreement is detected, and takes six clock cycles if the disagreement is detected.

(E) In the above embodiments, the memory access in step 5 starts in the first cycle in the MEM stage when the disagreement has been detected in step 4 as shown in FIGS. 10 and 13. However, it is alternatively possible not to have the memory access in step 5 started. This can be achieved by changing the construction of the processor 101/501 to input the disagreement signal 139, instead of the disagreement signal 141, to the reset terminal of the memory access control register 203 in FIG. 7. As a result, the memory access control register 203 can be reset in the EX stage so that the memory access in step 5 will not be performed.

(F) The above embodiments describe operations to process a memory access instruction without distinguishing the memory access instruction is for a read or a write although a separate data direction for a read and a write is explained. However, the following modification is possible when a memory access instruction is for a read. This is to say, on receiving the active disagreement signal 141, the access control register 203 in the memory access control circuit 119 may not be reset if the memory access instruction is for a read.

In this case, memory access for a read starts in a cycle where the disagreement signal 141 is made active, and data that has been read is outputted onto a data bus. However, this read data will not be inputted to the read data register 131 since the pipeline control circuit 126/526 has the pipeline stalled so that the read data register 131 is controlled not to receive the read data. As a result, the read data is abandoned. In parallel with this read, the memory access control circuit 119 sets the access mode, as shown in step 31 in FIG. 10, based on the result of the first space judgement. According to the set access mode, data is read from a memory unit specified by a memory address in the next cycle, and sent to the read data register 131.

(G) FIGS. 10 and 13 show step 5 for memory access, which is to be canceled, and step 3' for access mode setting as being performed sequentially. However, it is alternatively possible for the memory access control circuit 119 to perform step 31 in parallel with step 5.

(H) In the first embodiment, the first space judging circuit 115 and the second space judging circuit 134 decode the highest-order eighteen bits and the highest-order two bits, respectively, of the memory address 113. However, the circuits 115 and 134 may decode the above bits of an address other than the memory address 113, such as a DMA (direct memory access) address. In this case, the processor 101 may receive the 32-bit memory address 113 and a 32-bit DMA address which is sent from a DMA controller present in the periphery of the processor 101, and contain a selecting circuit that selects either the memory address 113 or the DMA address. This selecting circuit may select the DMA address in a DMA cycle. The first space judging circuit 115 and the second space judging circuit 134 then may decode the highest-order eighteen bits and two bits, respectively, of the selected address.

(I) The second embodiment states that the operand selecting circuit 546 in the processor 501 selects the highest-order two bits of data stored in either the operand register 111 or 112, and outputs the selected bits as the operand signal 547, and the second space judging circuit 134 decodes the two-bit operand signal 547. However, the operand selecting circuit 546 may alternatively select the highest-order eighteen bits of the data, and the second space judging circuit 134 may alternatively decode the 18-bit operand signal 547. Even when the construction of the processor 501 is modified to perform this operation, the second space judgement ends earlier than the first space judgement because the second space judgement is made in parallel with the address calculation in step 1. As a result, the substantial processing time taken in the EX stage becomes shorter than the time conventionally taken in the EX stage as shown in FIG. 2. In addition, the results of the first space judgement and the second space judgement always match when the processor 501 processes a memory access instruction in the 32-/16-bit absolute addressing mode. As a result, the frequency of the first and second space judgement results being different can be reduced.

(J) The present invention may be also used for an instruction fetch although the above embodiments describe the case when the invention is used for a memory access for a memory access instruction. When the invention is used for an instruction fetch, the first and second space judgements are performed for a fetch address, and the instruction fetch is started based on the result of the second space judgement. If results of the first and the second space judgements disagree, an instruction fetch based on the first space judgement result is performed, and an instruction that has been fetched based on the second space judgement result may be abandoned on a bus, as has been described in the above (F), without the instruction fetch processing based on the second space judgement being reset.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A processor that accesses a plurality of regions allocated to memory, comprising:

judging means for judging which region is accessed based on an access address;

assuming means for assuming which region is accessed based on the access address, the assuming means producing an assumption result faster than the judging means produces a judgement result;

accessing means for starting access based on the assumption result;

detecting means for detecting a disagreement between the judgement result and the assumption result; and control means for stopping the access that has been started if the detecting means has detected the disagreement, and controlling the accessing means to perform another access based on the judgement result.

2. The processor of claim 1, wherein the access address is in an address space that contains a first region and a second region;

wherein the first region contains a first subregion and a second subregion that are allocated respectively to a first memory element and a second memory element;

wherein by decoding M bits of the access address, the judging means judges which region, out of at least the first subregion, the second subregion, and the second region, is accessed; and wherein by decoding N bits, wherein N is smaller than M, of the access address, the assuming means judges which region, out of at least the first region and the second region, is accessed, and assumes that a region corresponding to the first memory element is accessed when judging that the first region is accessed.

3. The processor of claim 2, wherein when the assuming means has judged that the first region is accessed and the judging means has judged that a region which is not the first subregion is accessed, the detecting means detects the disagreement.

4. The processor of claim 1, further comprising address calculating means for calculating the access address according to operands of a memory access instruction, wherein the judging means and the assuming means decode M bits and N bits, respectively, of the calculated access address, wherein N is smaller than M.

5. The processor of claim 4, wherein the access address is in an address space that contains a first region and a second region;

wherein the first region contains a first subregion and a second subregion that are allocated respectively to a first memory element and a second memory element;

wherein by decoding the M bits, the judging means judges which region, out of at least the first subregion, the second subregion, and the second region, is accessed; and wherein by decoding the N bits, the assuming means judges which region, out of at least the first region and the second region, is accessed, and assumes that a region corresponding to the first memory element is accessed when judging that the first region is accessed.

6. The processor of claim 5, wherein when the assuming means has judged that the first region is accessed and the judging means has judged that a region which is not the first subregion is accessed, the detecting means detects the disagreement.

7. The processor of claim 1, further comprising address calculating means for calculating the access address according to operands of a memory access instruction, wherein by decoding the calculated access address the judging means makes a judgement and wherein by decoding data shown as an operand of the memory access instruction the assuming means makes an assumption.

8. The processor of claim 7, wherein the judging means decodes M bits of the calculated access address and wherein the assuming means decodes N bits, wherein N is smaller than M, of the data shown as the operand of the memory access instruction.

9. The processor of claim 8, wherein the access address is in an address space that contains a first region and a second region;

wherein the first region contains a first subregion and a second subregion that are allocated respectively to a first memory element and a second memory element;

wherein by decoding the M bits, the judging means judges which region, out of at least the first subregion, the second subregion, and the second region, is accessed; and wherein by decoding the N bits, the assuming means judges which region, out of at least the first region and the second region, is accessed, and assumes that a region corresponding to the first memory element is accessed when judging that the first region is accessed.

10. The processor of claim 9, wherein when the assuming means has judged that the first region is accessed and the judging means has judged that a region which is not the first subregion is accessed, the detecting means detects the disagreement.

11. A processor that operates in a pipeline consisting of at least an execution stage where the processor calculates an access address designated by a memory access instruction and a memory access stage where the processor accesses the calculated access address, the memory access stage immediately following the execution stage, the processor comprising:

judging means for judging which region is accessed by decoding M bits of the access address in the execution stage;

assuming means for assuming which region is accessed by decoding N bits, wherein N is smaller than M, of the access address in the execution stage, the assuming means producing an assumption result faster than the judging means produces a judgement result, detecting means for detecting, in the execution stage, a disagreement between the judgement result and the assumption result;

accessing means for starting access in the memory access stage based on the assumption result when the detecting means has detected no disagreement; and pipeline control means for extending the memory access stage when the detecting means has detected the disagreement, wherein the accessing means performs access based on the judgement result in the extended memory access stage.

12. The processor of claim 11, wherein the access address is in an address space that contains a first region and a second region;

wherein the first region contains a first subregion and a second subregion that are allocated respectively to a first memory element and a second memory element;

wherein by decoding the M bits, the judging means judges which region, out of at least the first subregion, the second subregion, and the second region, is accessed; and wherein by decoding the N bits, the assuming means judges which region, out of at least the first region and the second region, is accessed, and assumes that a region corresponding to the first memory element is accessed when judging that the first region is accessed.

13. The processor of claim 12, wherein when the assuming means has judged that the first region is accessed and the judging means has judged that a region which is not the first subregion is accessed, the detecting means detects the disagreement.

14. The processor of claim 13, further comprising:

address calculating means for calculating the access address according to operands of the memory access instruction, wherein the judging means and the assuming means decode M bits and N bits, respectively, of the calculated access address.

15. The processor of claim 13, further comprising:

two operand registers that store, in the execution stage, a base address and an offset address that are designated in the memory access instruction;

address calculating means for calculating the access address by adding the base address and the offset address in the two operand registers; and operand selecting means for selecting the base address outputted from one of the two operand registers, wherein the judging means decodes M bits of the calculated access address and wherein the assuming means decodes N bits of the base address that has been selected by the operand selecting means.

16. The processor of claim 15, wherein when the memory access instruction specifies the access address using absolute addressing, the two registers respectively store: (a) an absolute address as the base address; and (b) bits whose values are all zero as the offset address and wherein when the memory access instruction specifies the access address using register-relative addressing, the two registers respectively store: (a) data that has been transferred from a register as the base address; and (b) a relative address as the offset address.

17. The processor of claim 13, wherein the accessing means includes:

a result selecting unit for selecting the assumption result in the execution stage, and selecting the judgement result in the memory access stage only when the detecting means has detected the disagreement;

an access control unit for generating, in the execution stage, a plurality of first control signals used for a first memory access based on the selected assumption result, and generating, in the memory access stage, a plurality of second control signals used for a second memory access based on the selected judgement result when the detecting means has detected the disagreement; and an access control register for storing either the plurality of the first control signals or the plurality of the second control signals, and outputting either the first control signals or the second control signals to the first memory element and the second memory element in the memory access stage, wherein when the detecting means has detected the disagreement, the access control register is reset.

18. The processor of claim 17, further comprising a latch for latching a signal showing a detection result of the detecting means which indicates the disagreement, and outputting the signal to a reset terminal of the access control register in the memory access stage.

19. A processor that accesses an address space containing first to fourth regions, wherein the first region contains a first subregion and a second subregion that are respectively allocated to a first memory element and a second memory element, and wherein the second region, the third region, and the fourth region are allocated respectively to the first memory element, the second memory element, and a third memory element, the processor comprising:

judging means for decoding M bits of an access address to identify one region, out of the second to the fourth regions and the first to the second subregions, and to properly judge which element, out of the first to the third memory elements, is accessed;

assuming means for decoding N bits, wherein N is smaller than M, of the access address to identify one region, out of the first to the fourth regions, as being accessed, and to assume at high speed which element, out of the first to the third memory elements, is accessed, wherein when identifying the first region as being accessed, the assuming means assumes that the first memory element is accessed;

selecting means for selecting one of: (a) a judgement result of the judging means; and (b) an assumption result of the assuming means;

access control means for generating a plurality of control signals used for memory access based on a selection result of the selecting means;

an access control register for latching the plurality of the control signals, and outputting the latched control signals to the first to the third memory elements;

disagreement detecting means for detecting a disagreement where the assumption result shows that the first memory element is accessed and the judgement result shows that either the second memory element or the third memory element is accessed; and access cycle control means for having the selecting means select the judgement result when the detecting means has detected the disagreement.

20. The processor of claim 19, wherein the assuming means makes an assumption in a first cycle, wherein when the disagreement detecting means has detected no disagreement, the access cycle control means has the access control register output the latched control signals in a second cycle that follows the first cycle, and wherein when the disagreement detecting means has detected the disagreement, the access cycle control means has: (1) the selecting means select the judgement result in the second cycle; (2) the access control means generate a plurality of control signals based on the selected judgement result in the same second cycle; and (3) the access control register output, in a third cycle that follows the second cycle, the control signals which have been generated in the second cycle.

21. The processor of claim 20, wherein when the disagreement detecting means has detected the disagreement, the access control register is reset in either the first cycle or the second cycle.

* * * * *